July 31, 1962 J. J. SMITH 3,046,645
STOPPER INSERTING AND EXTRACTING MACHINE
Filed Dec. 3, 1959 4 Sheets-Sheet 1

FIG. I.

INVENTOR
JOHN J. SMITH
BY Cushman, Darby & Cushman
ATTORNEYS

July 31, 1962  J. J. SMITH  3,046,645
STOPPER INSERTING AND EXTRACTING MACHINE
Filed Dec. 3, 1959  4 Sheets-Sheet 2

INVENTOR
JOHN J. SMITH
BY Cushman, Darby & Cushman
ATTORNEYS

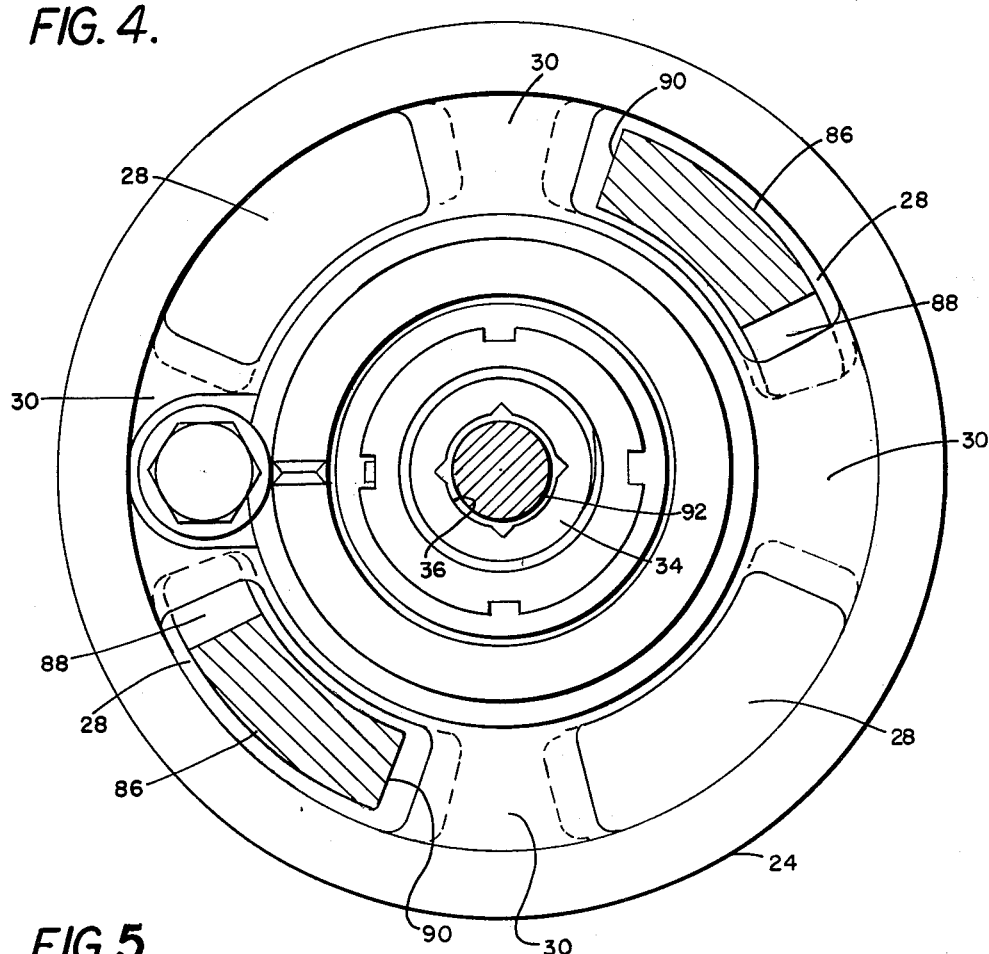
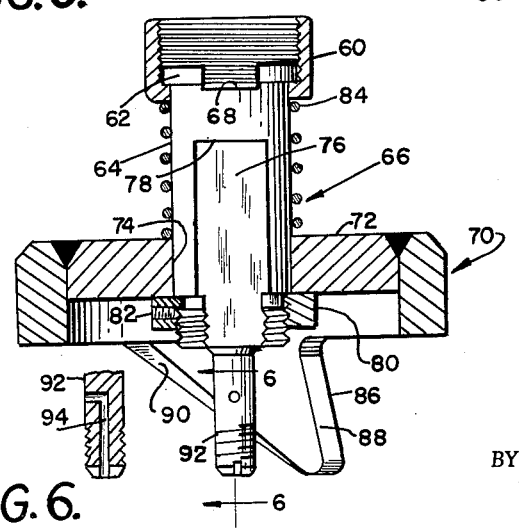

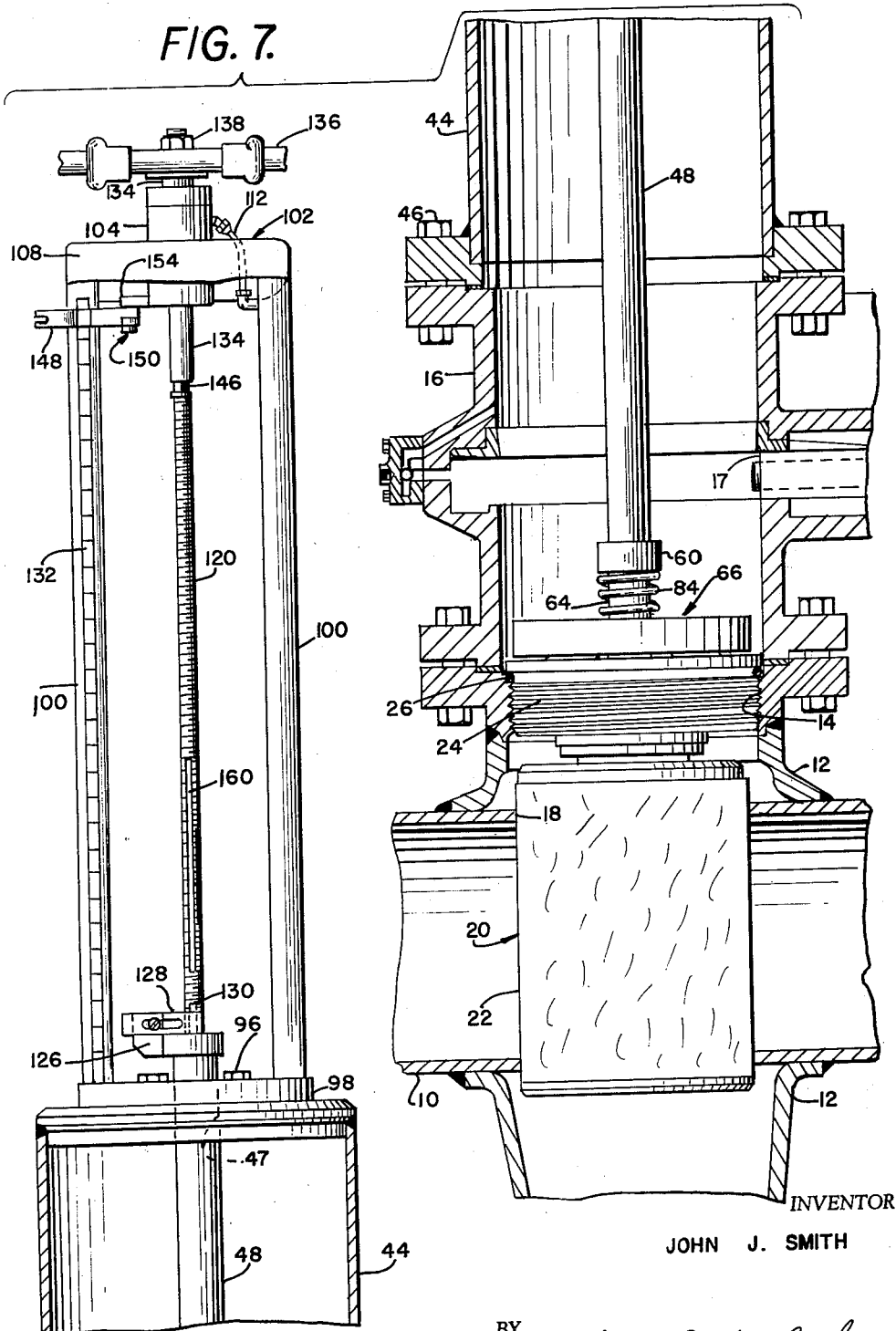

United States Patent Office 3,046,645
Patented July 31, 1962

1

3,046,645
STOPPER INSERTING AND EXTRACTING
MACHINE
John J. Smith, Decatur, Ill., assignor to Mueller Co.,
Decatur, Ill., a corporation of Illinois
Filed Dec. 3, 1959, Ser. No. 856,980
8 Claims. (Cl. 29—240)

This invention relates to improvements in apparatus for manipulating a part within a pressure chamber, from the exterior of such chamber and without the escape of fluid therefrom, by means of an operating rod or plunger extending through a wall of such chamber. More particularly, this invention relates to improvements in apparatus of the type disclosed in the patent to Mueller et al. No. 2,829,429, granted April 8, 1958.

Apparatus of the type disclosed in the above-mentioned patent is used for inserting or extracting threaded nipples into or from tapped openings in mains or pipes, threaded closure plugs into or from interiorly threaded openings in pipe fittings, such as stopper fittings, nipples, or T's when connected to a pipe, or threaded valve stems into or from interiorly threaded valve T's when connected to a pipe, etc., all while such pipes or mains are in service, i.e., fluid under pressure is confined therein. Since such apparatus is used to engage threads on one part with threads on another, it is highly desirable for an operator to retain his sense of feel while performing the thread engaging operation.

It will be seen, however, that when the pipe or pressure chamber in question contains fluid under high pressure, such pressure acts on the cross-sectional area of the part-manipulating plunger to constantly urge it outwardly of the pressure chamber. If an operator attempts to work against this pressure, his sense of feel is almost entirely lost. If mechanical means are urged to force the plunger inwardly, as for example, by a feed nut engaged with threads on the barrel or bell of the apparatus and with a yoke engaged with a shoulder on the plunger, as shown typically in Patents 2,171,939 and 2,650,620, an operator completely loses his sense of feel.

The apparatus described in the aforementioned patent to Mueller et al. 2,829,429 completely preserves the operator's sense of feel by providing a construction which utilizes the pressure being worked against in a balancing cylinder which counteracts the pressure force tending to urge the plunger outwardly of the chamber. While this apparatus has proved to be eminently satisfactory for its intended purpose, it possesses some disadvantages, particularly as respects larger sizes. For example, if the operation to be performed involves the threading of a large closure plug into a stopper fitting on a large pipe line, e.g., on the order of 12 inches in diameter, the travel of the plug, from its fully retracted position in the usual pressure chamber or bell through the usual gate valve, connected between the bell and the fitting, and into engagement with the threads in the mouth of the fitting, is of the order of about three feet. In order for the pressure-balanced construction shown in the aforementioned Mueller et al. patent to be capable of effecting such a travel, the balancing cylinder must be at least 3 feet long, and the operating plunger, in its fully retracted position, would have to extend an equal distance above or beyond the outer end of the cylinder. A balancing cylinder that is 3 feet long obviously is relatively expensive as well as heavy, while the combined length of the gate valve, pressure chamber or bell, balancing cylinder, and operating plunger, when retracted, would be over 9 feet. This would necessitate an operator to stand on a ladder to operate the

2 apparatus, obviously an undesirable procedure. Moreover, there is a practical limit to the length and weight of such apparatus that can be secured on a pipe line line or main.

Additionally, apparatus of the type with which this invention is concerned is also used to insert and extract the new type pipe stopper shown in my copending application, Serial No. 813,185. The stopper disclosed in that application includes a closure plug adapted for threaded engagement with the mouth of a stopper fitting, welded or otherwise suitably secured on a pipe line. In larger sizes, that stopper, together with its closure plug, is quite heavy, so that if the aforementioned pressure-balancing construction, as disclosed in the above-referred-to Patent 2,829,-429 is employed by itself to preserve an operator's sense of feel in inserting apparatus, the opposed balancing areas acted upon by fluid pressure must be precisely proportioned. Furthermore, an operator must raise and lower the stopper throughout its travel of the order of three feet between fully retracted and fully inserted positions. Obviously, the balancing areas, if used alone, must also be correlated with the actual pressure within the line and also with the weight of the stopper and its closure plug in order to pressure counterbalance such weight sufficiently so that the operator can lift the stopper, closure plug, and manipulating plunger. Line pressure variations, however, vastly complicate the correlating problem.

Consequently, it is an object of this invention to provide improved apparatus of the type under consideration which facilitates the engaging and disengaging of a threaded part with another while minimizing the over-all length and weight of such apparatus.

It is a further object of this invention to provide improved apparatus of the foregoing type which preserves to the operator his sense of feel at the time that the part being threadedly engaged initially engages the part with which it is being connected.

Other objects and advantages of the invention will become apparent from the following description and accompanying drawings, in which:

FIGURE 4 is an enlarged sectional view taken substantially on the line 4—4 of FIGURE 3.

FIGURE 5 is an elevational view, partly in vertical section, of the stopper inserting tool shown in FIGURES 1 and 3.

FIGURE 6 is a sectional view taken substantially on line 6—6 of FIGURE 5.

FIGURE 7 is a view corresponding to FIGURE 1 but showing the stopper installed in the cut-out opening in the main and expanded to shut off flow therethrough.

Figure 1:
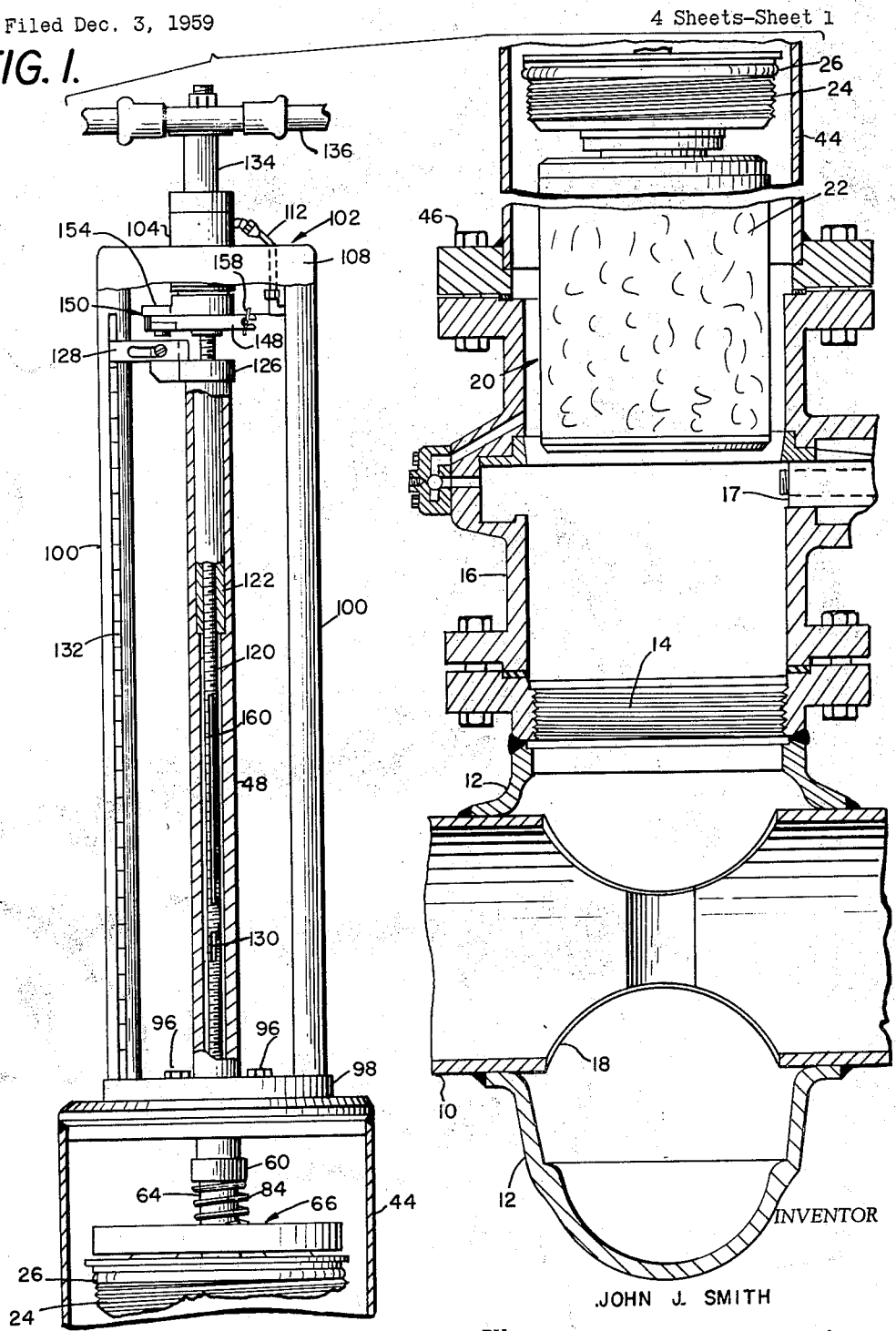
FIGURE 1 is a broken two-part elevational view, partly in vertical section, showing apparatus embodying this invention installed for inserting a stopper in a cut-out opening in a main. The stopper is shown in its fully retracted position before being advanced toward the main.

Referring now to the drawings, particularly FIGURE 1, there is shown apparatus embodying this invention for inserting and extracting a pipe stopper of the type disclosed in my above-mentioned copending application. Although the invention will be described with particular reference to its use for inserting and extracting such a stopper, it will be realized that the invention has other applications.

A stopper of the type referred to is used to shut off the flow in a main 10, which may be considered to be a pressure chamber, and for that purpose the main has welded or otherwise suitably secured thereto a stopper fitting 12 which encloses the main and has an interiorly threaded mouth or opening 14 disposed radially thereof. Through the use of known drilling mechanisms operating through a gate valve 16, provided with a valve gate 17, connected to the fitting 12, and by employing known methods, the main 10 is cut away within the fitting to provide a cylindrical opening 18 extending completely through the main from side to side thereof in alignment with the fitting mouth or opening 14 and of a diameter slightly greater than the interior diameter of the main. In order to shut off flow through the main 10, there is employed a stopper 20 which includes a split cylindrical sleeve 22 of a diameter, when relaxed, slightly less than that of the opening 18 through the main. The stopper 20 is carried by and projects from one side of an exteriorly threaded closure plug 24 for the fitting opening 14. The plug 24 preferably carries an O-ring 26 for sealing with the fitting opening 14 and the plug outer side has a plurality of circularly-arranged spaced recesses 28 which essentially form undercut radial ribs 30 for a purpose later described.

Suitable expanding mechanism (not shown) is disposed within the sleeve 22 in order to expand the same into flow-stopping sealing engagement with the edges of the cut-out opening 18 through the main 10. This mechanism may include, for example, and as shown in greater detail in my above-mentioned copending application, a pair of oppositely disposed conical wedge nuts 32 (FIGURE 3) engaged with complementary surfaces on the interior of the sleeve 22 and mounted on two sets of threads of reverse direction on a jack screw 34 that is swivelly connected to the closure plug 24. Within the outer end of the jack screw 34 is a noncircular socket 36 for the reception of an appropriate turning-tool (not shown). At the bottom of the socket 36 is the outer interiorly-threaded end of a passageway 38 that provides communication between the interior of the stopper 20 and the exterior of the closure plug 24. Normally, the passageway 38 is closed by a spring-pressed pressure-equalizing valve 40 having a stem 42 projecting upwardly or outwardly toward the socket 36.

The operations of inserting and extracting the aforedescribed stopper are also performed through the gate valve 16 by stopper inserting and extracting mechanism embodying this invention. The mechanism includes the usual barrel or bell 44 having its open end secured by bolts 46 to the valve 16. In a sense, the gate valve 16 and bell 44, when installed on the fitting 12, form a portion of the wall of the main 10. Extending through a circular opening 47 in the closed end of the bell 44, for free axial and rotary movement relative thereto, is a tubular operating plunger 48. Preferably, the plunger 48 is sealed to the closed end of the bell 44, as by an O-ring 50 disposed in a circumferential groove in a gland 52 removably secured within the opening 47. The forward end of the plunger 48 is closed, as by a closure plate or plug 54 (FIGURE 3) welded therein, and has its rim provided with a pair of diametrically-disposed longitudinally-extending lugs 56 having flat sides. The forward end of the plunger 48 also is provided with exterior threads 58 for engagement by a coupling nut 60 which also engages a flange or shoulder 62 on one end of the stem 64 of a stopper inserting tool 66 to secure the latter on the plunger. The end of the tool stem 64 also has a kerf 68 complementary to and for reception of the lugs 56 on the end of the plunger 48 so that when the stem is secured on the end of the plunger by the coupling nut 60, it is locked to the plunger for rotation and axial movement therewith.

Figure 3:
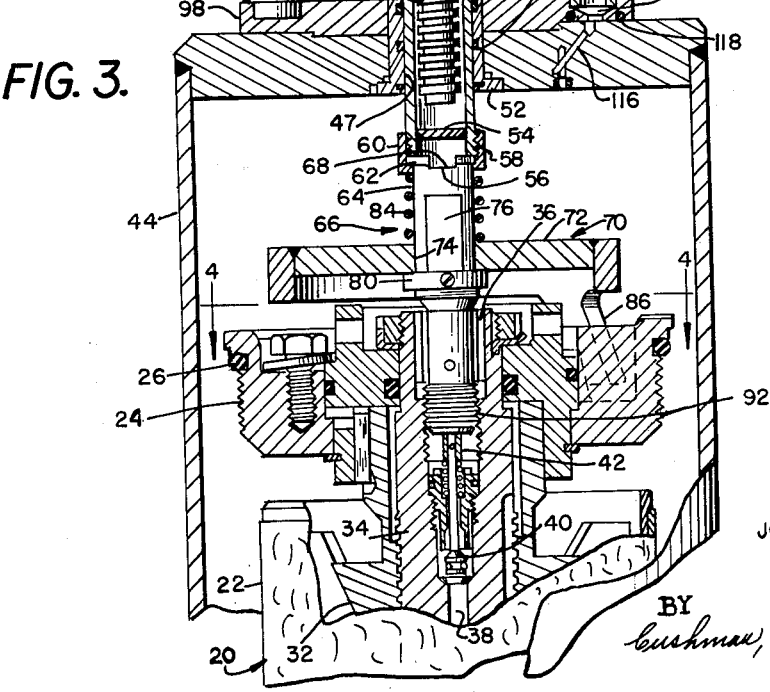
FIGURE 3 is an enlarged fragmentary vertical sectional view of a lower portion of the apparatus shown in FIGURE 1.

Slideable on the stem 64 of the tool 66 is a closure-plug-engaging ratchet-like fork 70 having a plate-like portion 72 provided with an aperture 74 for reception of the stem, as best shown in FIGURE 5. The stem 64 is provided with a portion of a noncircular configuration, such as by flats 76 on its opposite sides, and the aperture 74 in the fork 70 is complementary to such configuration so that the fork is restrained against rotation relative to the stem. Movement of the fork 70 along the stem 64 is limited at one end by shoulders 78 at the outer ends of the flats 76, and at the opposite end by a stop nut 80 threaded onto the stem and locked thereto by a set screw 82. A coil compression spring 84 interposed between the fork 70 and the coupling nut 60 constantly urges the former against the stop nut 80. The plate-like portion 72 of the fork 70 is provided with a peripheral skirt from which depend a pair of diametrically opposite pawls or fingers 86 each provided with rearwardly-inclined forward and rearward faces 88 and 90, respectively, the rearward face 90 being inclined at a greater angle than the forward face 88. The forward end of the stem 64 is provided with a reduced threaded extension 92 adapted to engage within the threaded end of the passageway 38 at the bottom of the socket 36 in the jack screw 34 to retain the entire stopper assembly, including the closure plug 24, on the inserting tool 66. The extension 92 also is adapted to engage with the valve stem 42 and push the latter inwardly to open the valve 40 as shown in FIGURE 3. In this connection, the extension 92 has a passageway 94 therein (FIGURE 6) to provide communication between the outer side of the closure plug 24 and the passageway 38 when the extension is threaded into the latter.

In operation of the apparatus, the fork 70 is pushed rearwardly against the spring 84 and the threaded extension 92 screwed loosely into the threaded end of the passageway 38 in the jack screw 34 until the valve 40 is opened as aforedescribed. At this time, the fork 70 is released so that the spring 84 will push it against the closure plug 24 and the forward faces 88 of the fingers 86 will engage against appropriate undercut sides of the ribs 30 on the closure plug, so that when the stem 64 is rotated in a direction to thread the plug 24 into the mouth 14 of the stopper fitting 12, the fingers will turn the plug. After the closure plug 24 has been screwed tightly into the stopper fitting 12, by the stopper inserting and extracting mechanism as will be described hereinafter, it will be seen that on reverse rotation of the stem 64, the rear faces 90 of the fingers 86 will ride up over the ribs 30 on the plug 24 so that the latter will remain threaded into the fitting 12 while the threaded extension 92 on the stem is unscrewed from its loose engagement with the stopper assembly.

Detachably secured, as by screws 96, to the closed end of the bell 44 is an overlying plate 98 having a pair of posts 100 extending upwardly or rearwardly of the bell on opposite sides and in parallel relation to the operating plunger 48. The outer ends of the posts 100 are reduced and threaded for extension through aligned apertures in a cross bar 102 welded, or otherwise suitably secured, to a relatively short pressure-balancing cylinder 104. Nuts 106 threaded onto the outer ends of the posts 100 retain the cylinder 104 firmly in position in alignment with the operating plunger 48. Preferably, the bar 102 is generally H-shaped in cross-section with the legs of the H constituting stiffening side flanges 108. The lower or forward end of the cylinder 104 is vented to the atmosphere, as by an opening 110 provided with a screen, while the upper or rearward end of the cylinder is connected to the interior of the stopper bell 44 for the admission of pressure fluid therefrom into the cylinder. This connection may be effected by a pipe 112 connected between the rearward end of the cylinder 104 and the adjacent end of one of the posts 100 which may be tubular and have such end plugged, as shown. The lower end of such post 100 communicates with an aperture 114 in the plate 98 that registers with an aperture or passageway 116 extending through the bell closed end. One end of the aperture or passageway 116 may be provided with a screen, while a seal is effected between the apertures 114 and 116, as by a groove in the plate 98 extending about the aperture 114 and an O-ring 118 in such groove engaged with the opposed surface of the closed end of the bell 44.

Figure 2:
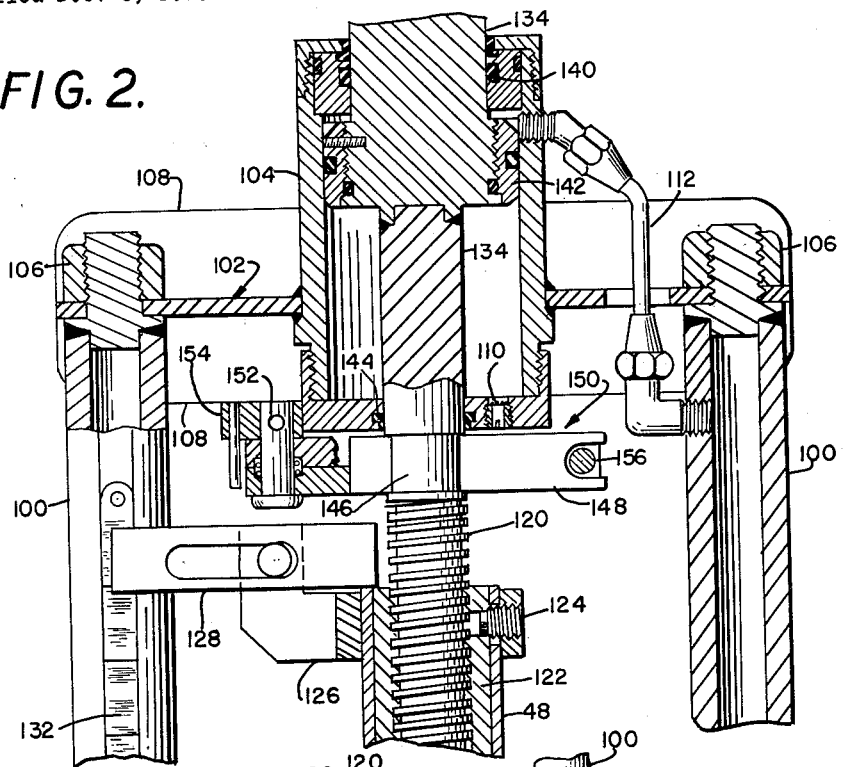
FIGURE 2 is an enlarged fragmentary vertical sectional view of an upper portion of the apparatus shown in FIGURE 1.

Extending within the tubular operating plunger 48 is a jack or feed screw 120 engaged with an elongated feed nut 122 secured within the outer end of the plunger, as by means of an inner end of a radial screw 124 (FIGURE 2) which also serves to retain a bracket 126 on the rearward end of the plunger. It will be seen that when the plunger 48 is fixed against rotation, rotation of the feed screw 120, if restrained against axial movement, will move the plunger axially, i.e., reciprocate the latter. The feed screw 120 is long enough to move the plunger 48 from its fully retracted position shown in FIGURE 1 to its fully extended position wherein the closure plug 24 is screwed into the fitting 12 as shown in FIGURE 7. Mounted on the bracket 126 and shiftable radially of the plunger 48 is a clutch or locking member 128 having forks at its opposite ends. In its radially outermost position the outer fork on the member 128 slidably engages one of the posts 100, as shown in FIGURES 1 and 2, and restrains the plunger 48 against rotation while permitting reciprocating movement thereof. In its radially innermost position, shown in FIGURE 7, the inner fork on the member 128 is adapted to engage a pair of diametrically opposite flats 130 on the screw 120 adjacent its forward end and lock the plunger 48 to the screw 120 for rotation and reciprocation therewith. The construction of the locking member 128 is shown more in detail in the patent to Mueller et al. 2,664,262. The post 100 engageable by the member 128 may be provided with a scale 132 which cooperates with the member 128 to indicate the extent of forward movement of the stopper assembly from its fully retracted position in the bell 44.

The feed screw 120 is provided with a rearward or upper extension 134 that passes through the cylinder 104 and has a noncircular section on its end adapted for the reception of a turning tool, such as a ratchet wrench 136, which may be retained on the extension by a nut 138. The rearward portion of the extension 134 is sealed to the rearward end of the cylinder 104, as by an O-ring 140, and a piston 142 is secured on the screw extension within the cylinder. Preferably, the forward end of the cylinder 104 has a wiper ring 144 for the screw extension 134. The area of the piston 142 exposed to pressure fluid within the rearward end of the cylinder 104 and urging the piston toward the stopper bell 44 preferably is equal to or slightly less than the cross-sectional area of the plunger 48 which is acted upon by pressure within the bell to move such plunger rearwardly. Consequently, it will be seen that when the balancing cylinder 104 is operative, as later described, the effects of pressure on the plunger 48 will be substantially counterbalanced or, preferably, somewhat overbalanced in a direction to move the plunger upwardly or rearwardly. Such overbalancing will somewhat counterbalance, and thus provide some compensation for, the weight of the plunger 48, the inserting tool 66, and the stopper 20 and its closure plug 24. As will be later evident, this will relieve the operator from the necessity of suspending or supporting all of the foregoing weight while he is performing the operation of threading the closure plug 24 into the stopper fitting 12.

The feed screw 120, between its threads and its rearward extension 134, is provided with a circumferential groove 146 adapted for the reception of the opposed arms 148 of a clamp arrangement 150 which engages the opposed abutments defined by the side walls of the groove 146 to restrain axial movement of the screw 120 and also retain it in a position wherein the piston 142 is at its rearmost position, as shown in FIGURE 2. One end of each clamp arm 148 is mounted on a pivot pin 152 fixed on a bracket 154 at the forward end of the cylinder 104, while the other ends of the arms 148 are provided with an arrangement to clamp the arms together in position to engage the circumferential groove 146. Such arrangement may take the form of a bolt 156 having one end thereof pivotally secured to an end of one of the arms 148 and having its other and threaded end adapted to be received in the notch in the other clamp arm. A wing nut 158 on the bolt 156 serves to retain the two arms 148 in the aforementioned clamping engagement. The entire clamp arrangement 150 may be similar to that shown more in detail in Patent No. 2,895,352 to Mueller et al.

*Operation*

After the opening 18 has been cut through the main 10, the gate valve 16 closed, and the drilling mechanism (not shown) removed therefrom, the bell 44 of the stopper inserting and extracting apparatus is secured on top of the gate valve, as shown in FIGURE 1. Before the bell 44 is so mounted on the gate valve 16, the stopper assembly has the inserting tool 66 connected thereto as previously described, and such tool is secured on the end of the plunger 48 by the coupling nut 60. The feed screw 120 is moved to its rearward or outermost position and the clamp arrangement 150 engaged with the groove 146 in the screw to retain it in such position. The feed screw 120 is then rotated in a direction to move the stopper assembly to its fully retracted position within the bell 44 before the latter is bolted to the valve 16.

With the parts so positioned within the bell 44, and the latter bolted to the gate valve 16, the valve may then be opened to allow pressure fluid from the main 10 to flow into the bell and through the hollow post 100 into the rearward end of the balancing cylinder 104. The feed screw 120 is then rotated to advance the plunger 48 and move the stopper 20 out of the bell 44, down through the gate valve 16, and through the cut-out opening 18 in the main 10 until the closure plug 24 is nearly in position to engage with the threaded opening 14 in the stopper fitting 12. The pair of flats 130 on the feed screw 120 are so located that when the plunger 48 is in this advanced position the locking member 128 can be shifted radially inwardly to engage with such flats and thus lock the plunger to the feed screw for rotation and axial movement therewith. The clamp arrangement 150 is then loosened and disengaged from the feed screw 120 so that the balancing cylinder 104 will become operative. The operator by manipulating the wrench 136 may then advance the stopper assembly further inwardly or forwardly until the threads on the closure plug 24 initially engage those within the opening 14 in the stopper fitting 12. In this connection, even if the balancing cylinder 104 does not compensate for the weight of the plunger 48, of the inserting tool 66, and of the stopper assembly, it will be seen that in this position of the parts such weight will be borne by the initially engaged threads, while at the same time the operator's sense of feel will be preserved so that he can start the threads into their initial meshing engagement by appropriately manipulating the outer or rearward end of the feed screw 120 by the wrench 136.

After the closure plug 24 has been screwed tightly into the stopper fitting 12 as shown in FIGURE 7, by appropriate manipulation of the feed screw 120, the latter is turned in a reverse direction to release the inserting tool 66 from the closure plug 24, as aforedescribed. The plunger 48 may then be pulled upwardly or rearwardly by an operator until the circumferential groove 146 on the feed screw 120 is in alignment with the clamp arrangement 150. In this position of the parts, the clamp arrangement 150 is engaged with the groove 146 and the clutch or locking member 128 shifted radially outwardly so that rotation of the feed screw 120 will serve to move the inserting tool 66 back through the gate valve 16 into its fully retracted position within the stopper bell 44. Thereupon, the entire apparatus, including the gate valve 16, can be detached and removed from the stopper fitting 12 so that the closure plug 24 can be further tightened in place, if required, and the stopper 20 operated to shut off flow through the line, as described in my aforementioned copending application.

In order to extract the stopper 20 from the fitting 12, the same apparatus is used, but the inserting tool 66 is converted to an extracting tool by replacing the fork 70 with an extracting fork (not shown) that has its fingers inclined oppositely from those of the inserting fork. With this extracting tool secured to the end of the plunger 48, and the entire apparatus remounted on the stopper fitting 12, the extracting tool may be moved down in accordance with the foregoing procedure, and manipulated to screw the extension 92 into the threaded outer end of the passageway 38 in the stopper assembly. In performing this operation, it will be seen that the rear faces of the fingers on the extracting fork will ride over the ribs 30 on the closure plug 24. When the extracting tool is reversely rotated, however, its fingers will engage with the ribs 30 and thus unscrew the plug 24 from the stopper fitting 12 so that it can be fully retracted into the stopper bell 44 as aforedescribed. Thereafter the inserting tool 66 may be used to replace the stopper assembly by a plain closure plug (not shown) for the fitting 12 similar to the closure plug 24 employed with the stopper 20, i.e., provided with radial ribs for engagement by the fingers 86 on the inserting tool and a central interiorly threaded passageway provided with a pressure equalizing valve for engagement by the threaded extension 92 on the tool.

It will be seen that the plate 98 which is detachably secured to the stopper bell 44 permits the latter to be changed for use with different size stoppers, gate valves, and stopper fittings, thus avoiding the necessity of providing a complete apparatus for any one size stopper. In this same connection, the feed screw 120 is provided with a pair of elongated flats 160, above the pair of flats 130, for the same purpose, i.e., to adapt the apparatus for use with stoppers and fittings of smaller size which have a lesser length of travel from fully retracted to fully extended position.

It thus will be seen that the objects of this invention have been fully and effectively accomplished. It will be realized, however, that the foregoing specific embodiment has been shown and described only for the purpose of illustrating the principles of this invention and is subject to extensive change without departure from such principles. Therefore, this invention includes all modifications encompassed within the spirit and scope of the following claims.

I claim:

1. In apparatus for manipulating a part within a pressure chamber from the exterior of the latter and without the escape of fluid therefrom, the combination comprising: means detachably connectable to the pressure chamber to form a portion of the wall thereof; plunger means sealingly extending through said wall portion and independently reciprocable and rotatable relative thereto for demountably carrying and manipulating a part within the chamber by rotating said plunger means and moving the same inwardly and outwardly of the chamber from the exterior thereof, said plunger means including threadedly-engaged telescoping inner and outer parts with said outer part sealingly extending through said wall portion; means fixedly connected to said wall portion and detachably engaging said inner part for restraining the latter against axial movement so that rotation of said inner part relative to said outer part will reciprocate said outer part; slideway means fixed to said wall portion and extending longitudinally of said plunger means; means mounted to said outer part and alternatively operable to engage said slideway means to restrain rotation of said outer part or, when said outer part has advanced a predetermined distance into the chamber, to engage said inner part in a manner to lock said parts together for reciprocation and rotation as a unit; a cylinder having said plunger means extending therethrough; means for securing said cylinder to said wall portion against reciprocation with said plunger means; piston means on said plunger means within said cylinder; means for venting said cylinder, to atmosphere; and conduit means for connecting said cylinder with the pressure chamber in order to counterbalance the pressure force acting on the plunger to move it outwardly of the pressure chamber when said wall portion is connected thereto and said axial-movement restraining means is disconnected from said inner part.

2. The structure defined in claim 1 in which the inner plunger part has an outward extension passing through the cylinder and the latter is fixed to the end of the slideway means.

3. The structure defined in claim 2 in which the axial-movement-restraining means for the inner part is mounted to the cylinder.

4. In apparatus for manipulating a part within a pressure chamber from the exterior of the latter and without the escape of fluid therefrom, the combination comprising: a barrel having an open forward end; means at said end for detachably connecting said barrel fluid-tight to a pressure chamber in communication with the interior thereof; a plunger extending through and independently reciprocable and rotatable in said barrel for demountably carrying a part on the forward end of said plunger and manipulating the part within the pressure chamber by manipulation of the rearward end of said plunger exteriorly of said barrel; feed screw means threadedly engaged within the rearward end of said plunger; means fixed to said barrel and detachably engageable with said feed screw means to restrain axial movement thereof so that rotation of said feed screw means will reciprocate said plunger; a slideway mounted to said barrel and extending longitudinally of said plunger; means mounted to said plunger and alternatively operable to either engage said slideway to restrain said plunger against rotation or when the latter has advanced a predetermined distance relative to said barrel, to engage said feed screw in a manner, to lock said plunger to said feed screw for rotation and axial movement therewith; a cylinder fixed to said barrel and of shorter length than said feed screw; an extension on said feed screw extending through said cylinder; a piston on said extension within said cylinder; conduit means communicating the rearward end of said cylinder with the interior of said barrel; and means for venting the forward end of said cylinder, to atmosphere.

5. Apparatus for inserting and threading a plug-like closure into an interiorly-threaded opening in a pressure chamber, comprising: a bell having an open forward end; means at said end for detachably connecting said bell fluid-tight to said chamber in surrounding relation to the opening; a plunger sealingly extending through the other end of said bell and independently reciprocable and rotatable relative thereto; means on the forward end of said plunger for detachably carrying the closure; a feed screw threadedly engaged within the rearward end of said plunger; post means mounted on said bell and extending rearwardly thereof in spaced relation to said plunger; a cylinder carried on the rearward end of said post means in axial alignment with said feed screw, said cylinder being shorter than said feed screw; an extension on said feed screw extending through said cylinder; a piston on said extension within said cylinder; conduit means, including a passageway through said post means, for communicating the rearward end of said cylinder with the interior of said bell; means for venting the forward end of said cylinder to atmosphere; means carried by said cylinder and detachably engageable with said feed screw extension at the forward end of said cylinder for restraining said feed screw against axial movement from a position wherein said piston is adjacent the rearward end of said cylinder; and means carried by the rearward end of said plunger and alternatively operable to either slidably engage said post means to restrain said plunger against rotation or engage said feed screw to lock said plunger thereto for rotation and axial movement therewith when said plunger has been advanced a predetermined distance out of said bell.

6. The structure defined in claim 5 in which the cross-sectional area of the plunger acted upon by fluid pressure within the bell to urge said plunger rearwardly is at least as large as the area of the piston acted upon by fluid pressure to urge said piston forwardly.

7. The structure defined in claim 5 in which the feed screw axial-movement-restraining means includes abutment means engageable with oppositely facing shoulders on the feed screw.

8. The structure defined in claim 5 including means carried by the forward end of said post means for detachably mounting the latter to the bell other end.

References Cited in the file of this patent
UNITED STATES PATENTS

| | | |
|---|---|---|
| 2,664,262 | Mueller | Dec. 29, 1953 |
| 2,829,429 | Mueller | Apr. 8, 1958 |